US010232278B2

United States Patent
Suzuki et al.

(10) Patent No.: US 10,232,278 B2
(45) Date of Patent: Mar. 19, 2019

(54) ACCESSORY PREPARATION TOY

(71) Applicant: Sega Toys Co., LTD., Tokyo (JP)

(72) Inventors: Hiromi Suzuki, Tokyo (JP); Sakuya Kubota, Tokyo (JP); Satoshi Yamada, Tokyo (JP)

(73) Assignee: Sega Toys Co., Ltd., Tokyo (JP)

( * ) Notice: Subject to any disclaimer, the term of this patent is extended or adjusted under 35 U.S.C. 154(b) by 275 days.

(21) Appl. No.: 15/239,007

(22) Filed: Aug. 17, 2016

(65) Prior Publication Data
US 2017/0056781 A1    Mar. 2, 2017

(30) Foreign Application Priority Data

Aug. 25, 2015  (JP) ................. 2015-165576

(51) Int. Cl.
*A63H 33/00* (2006.01)
*C08K 3/08* (2006.01)
*C08K 7/00* (2006.01)

(52) U.S. Cl.
CPC .............. *A63H 33/001* (2013.01); *C08K 3/08* (2013.01); *C08K 7/00* (2013.01); *C08K 2003/0806* (2013.01); *C08K 2003/0831* (2013.01)

(58) Field of Classification Search
USPC .......... 446/70, 85, 87, 385, 491; 434/81, 82, 434/276; 206/219, 222; 222/94, 129, 222/145.1, 145.5; 428/12
See application file for complete search history.

(56) References Cited

U.S. PATENT DOCUMENTS

| | | | |
|---|---|---|---|
| 5,720,416 A * | 2/1998 | Izoe ................ | A47K 5/1212 222/138 |
| 5,934,969 A | 8/1999 | Rehkemper et al. | |
| 6,261,146 B1 * | 7/2001 | Spector ................ | A63H 3/02 446/385 |
| 6,345,733 B1 * | 2/2002 | Bennett ............. | B65D 39/16 222/145.3 |

(Continued)

FOREIGN PATENT DOCUMENTS

| | | |
|---|---|---|
| JP | 2010-110385 A | 5/2010 |
| JP | 2013-78565 A | 5/2013 |
| WO | 2015/106006 A1 | 7/2015 |

OTHER PUBLICATIONS

Extended European Search report for Application No. 16185192.8-1658 dated Jan. 30, 2017.

*Primary Examiner* — Kurt Fernstrom
(74) *Attorney, Agent, or Firm* — The Marbury Law Group, PLLC

(57) ABSTRACT

With a view to providing an accessory preparation toy which can prepare accessories of various sizes, colors, patterns and shapes easily and simply with joy, a storage container includes a main material storage portion, an auxiliary material storage portion and a mixing chamber. A main material and an auxiliary material which make up a mixed curable resin material are stored separately in the main material storage portion and the auxiliary material storage portion. Opening portions of the main material storage portion and the auxiliary material storage portion are formed so as to be opened by pressing the main material or the auxiliary material stored therein with fingers. Lamé flakes which represent a decorative material are mixed into the main material.

2 Claims, 8 Drawing Sheets

(56) References Cited

U.S. PATENT DOCUMENTS

| | | | | |
|---|---|---|---|---|
| 6,464,557 | B1 * | 10/2002 | Ohba | A63H 9/00 264/328.12 |
| 6,503,582 | B1 * | 1/2003 | Nardoza | A63H 33/001 428/12 |
| 6,655,551 | B2 * | 12/2003 | Manne | B01F 15/0237 222/132 |
| 7,325,703 | B2 * | 2/2008 | Gherdan | A61J 1/035 206/219 |
| 7,344,378 | B2 * | 3/2008 | Ichikawa | G09B 23/12 434/276 |
| 9,173,530 | B2 * | 11/2015 | Fallat, II | A45D 34/04 |
| 2004/0206775 | A1 * | 10/2004 | Holmes | B05B 11/0043 222/94 |
| 2005/0112992 | A1 * | 5/2005 | Malcolm | A63H 9/00 446/325 |
| 2006/0166177 | A1 * | 7/2006 | Hageman | G09B 23/24 434/276 |
| 2006/0216256 | A1 * | 9/2006 | Giniger | A61K 8/046 424/70.1 |
| 2008/0230298 | A1 * | 9/2008 | Buch | B65D 47/42 180/311 |
| 2010/0044377 | A1 * | 2/2010 | Porter | B65D 51/2828 220/212 |
| 2010/0200437 | A1 * | 8/2010 | Coon | B65D 25/085 206/222 |
| 2011/0263177 | A1 * | 10/2011 | Lemchen | A63H 33/04 446/87 |

* cited by examiner

ACCESSORY PREPARATION TOY

CROSS-REFERENCE TO RELATED APPLICATION

This application is based upon and claims the benefit of priority under 35 USC 119 of Japanese Patent Application No. 2015-165576 filed on Aug. 25, 2015, the entire disclosure of which, including the description, claims, drawings and abstract, is incorporated herein by reference.

BACKGROUND OF THE INVENTION

Field of the Invention

The present invention relates to a toy with which infants can enjoy playing by preparing accessories.

Description of the Related Art

As toys particularly for female infants, there have been developed various types of toys with which they can play by preparing accessories. For example, an accessory preparation toy disclosed in Japanese Unexamined Patent Publication No. 2013-78565 (JP-A-2013-78565) includes a first plate on which a plurality of first accessory parts are provided and a second plate on which a plurality of second accessory parts are provided. Further, this accessory preparation toy includes a pressing unit for pressing the first plate and the second plate so that the first accessory parts and the second accessory parts are cut out from the first plate and the second plate. Then, the first accessory parts and the second accessory parts that are cut out by the pressing unit are accommodated in an accommodating case.

In the accessory preparation toy disclosed in JP0-A02013-78565, by preparing the first accessory parts and the second accessory parts which are shaped variously, a player can enjoy playing with the toy by preparing accessories of various shapes. However, the sizes of accessories so prepared are limited by the size of a main body of the accessory preparation toy. In addition, preparing plates including accessory parts of various colors, patterns and shapes takes some labor hours and cost. In this respect, too, the degree of freedom in preparing accessories is limited.

SUMMARY OF THE INVENTION

The invention provides an accessory preparation toy with which a player can prepare accessories of various sizes, colors, patterns and shapes easily and simply with joy.

According to an aspect of the invention, there is provided an accessory preparation toy which has a mixed curable resin material which is made up of a main material and an auxiliary material and a storage container which stores the main material and the auxiliary material separately, wherein a decorative material is mixed into the main material or the auxiliary material.

In addition, the mixed curable resin material can be a two-pack silicone resin.

The decorative material can be a lamé material, a pearlescent material, a flake or powder of glass, metal or silica, a resin chip, ground stone, a ground wood material or a coloring liquid material, or a combination of any or some of them.

The storage container has a main material storage portion where the main material is stored, an auxiliary material storage portion where the auxiliary material is stored and a mixing chamber where the main material and the auxiliary material are mixed together.

The main material storage portion or the auxiliary material storage portion has an opening portion which can be opened by pressing the main material or the auxiliary material stored therein with fingers, and the opening portion is disposed so as to be opened to the mixing chamber.

According to the aspect of the invention, the accessory preparation toy has the mixed curable resin material in which the main material or the auxiliary material includes the decorative material. Consequently, the main material and the auxiliary material are mixed together into the mixed curable resin material, and the mixed curable resin material is poured into molds to be cured therein, whereby accessories of various sizes, colors, patterns and shapes can be prepared.

The two-pack silicone resin is used as the mixed curable resin material, whereby it is possible to provide the accessory preparation toy which is easy to be handled and which can prepare accessories of a good touch once they get cured.

By selecting appropriate decorative materials from prepared ones according to an infant's preference, it is possible to prepare easily accessories with good decorative effects.

The storage container where the mixed curable resin material is stored includes the main material storage portion, the auxiliary material storage portion and the mixing chamber, whereby the container can be formed as an integral compact container.

The main material storage portion or the auxiliary material storage portion includes the opening portion which is opened by pressing the stored main material or auxiliary material with fingers, whereby the main material and the auxiliary material can easily be mixed together.

DETAILED DESCRIPTION OF THE PREFERRED EMBODIMENTS

Figure 4:
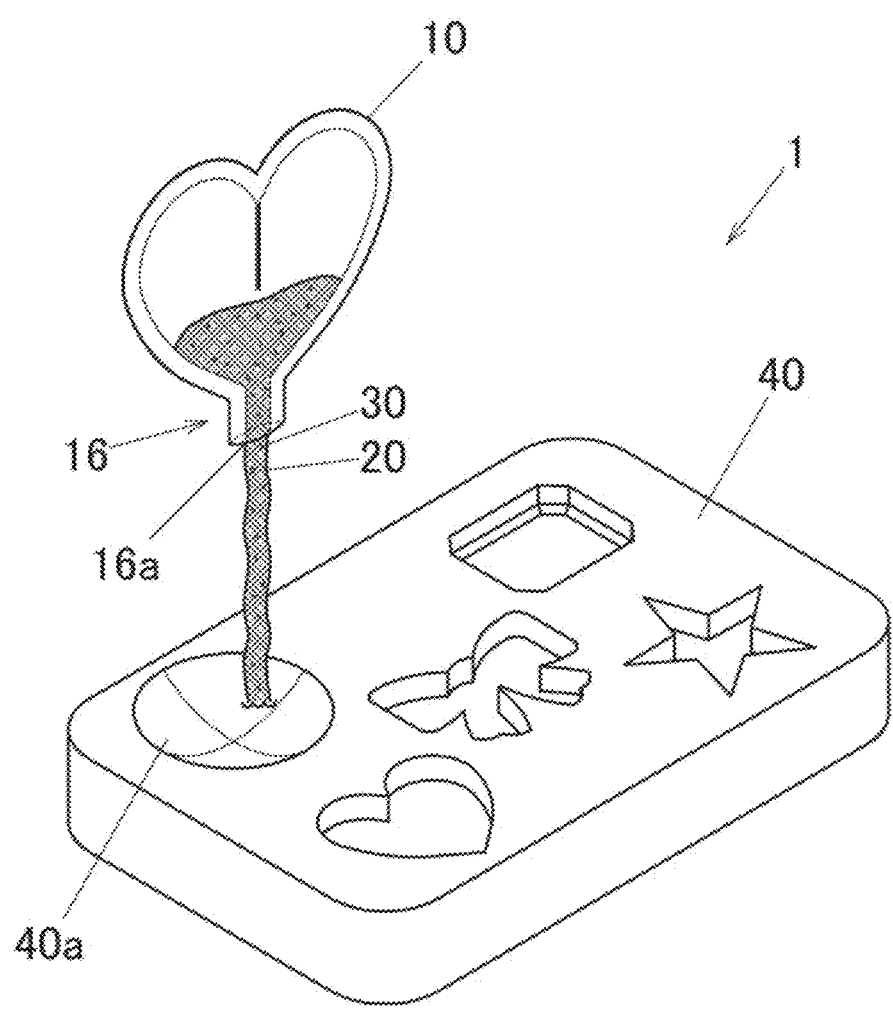
FIG. 4 is a perspective view showing schematically how the mixed curable resin material is poured into molds in the accessory preparation toy according to the embodiment of the invention.

Hereinafter, embodiments of the invention will be described based on the accompanying drawings. An accessory preparation toy 1 according to an embodiment of the invention is a toy with which a player can enjoy preparing accessories like one shown in FIG. 5 by pouring a mixed curable resin material in which two liquids are mixed together into a desired mold 40a of a mold member 40 as shown in FIG. 4. In this embodiment, a two-pack silicone resin 20 is used as the mixed curable resin material that is sealed in a storage container 10 shown in FIG. 1. The two-pack silicone resin 20 is made up of a main material 21 and an auxiliary material 22 which works as a curing agent. Here, lamé flakes 30 are mixed in the main material 21 of the two-pack silicone resin 20, and the lamé flakes 30 are a lamé material which works as a decorative material.

The storage container 10 has substantially a heart shape when seen from the front. A rectangular projecting portion 16, which is vertically long when seen from the front, is formed at a lower portion of the storage container 10. The storage container 10 is formed of a transparent resin material such as polyethylene. An outer circumferential portion 17 of the storage container 10 is joined through fusion bonding. The storage container 10 is formed by joining together outer circumferential portions of a plurality of similarly shaped transparent resin films through fusion bonding. Consequently, a closed state is produced in an interior space in the storage container 10.

Figure 1:
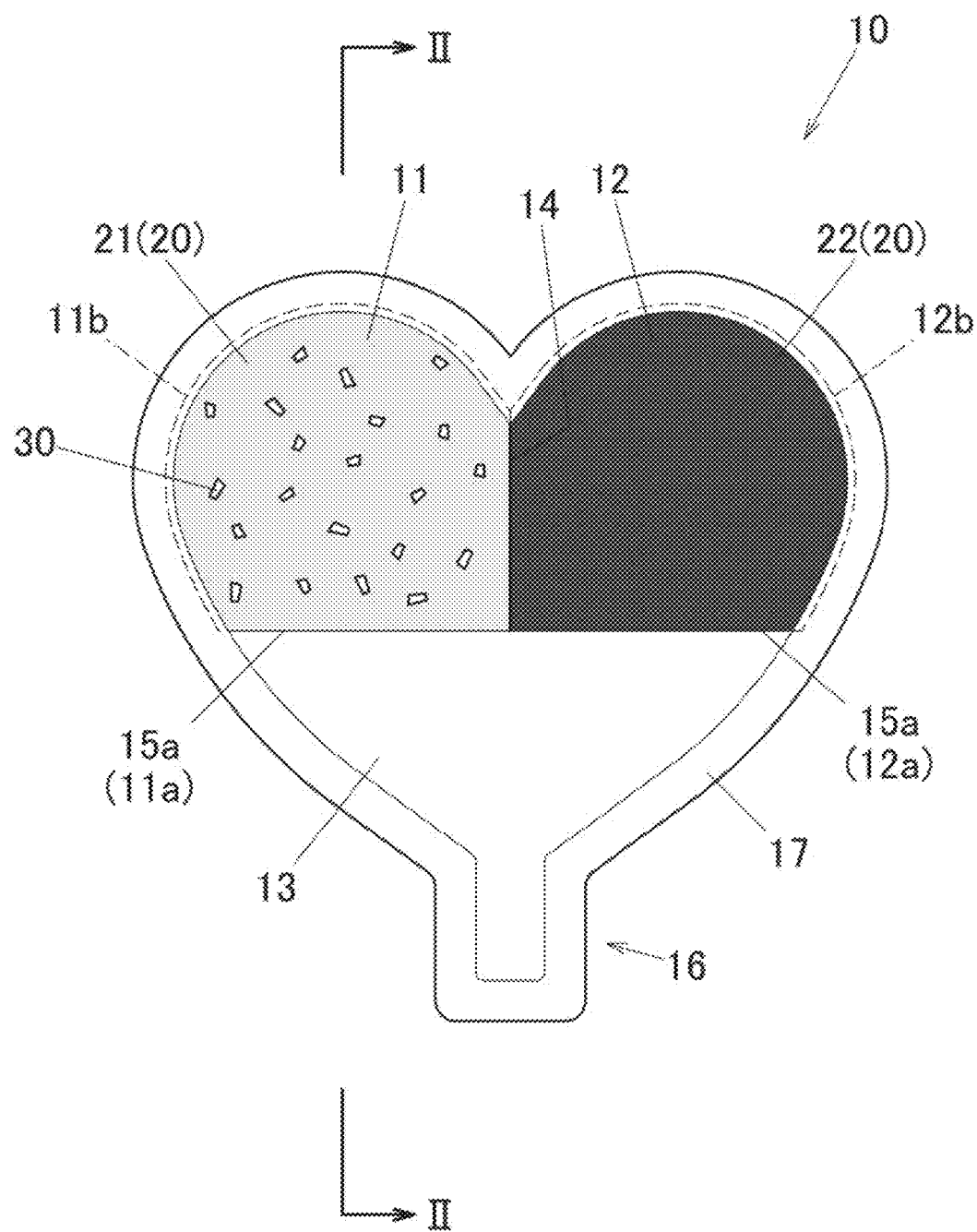
FIG. 1 is a schematic front view showing a storage container of an accessory preparation toy according to an embodiment of the invention where a mixed curable resin material made up of a main material and an auxiliary material is stored.

A main material storage portion 11 is formed in a left upper protuberant portion of the container 10 shown in FIG. 1, and the main material 21 of the two-pack silicone resin 20 is stored in this main material storage portion 11. An auxiliary material storage portion 12 is formed in a right upper protuberant portion of the container 10 shown in FIG. 1, and the auxiliary material 22 is stored in this auxiliary material storage portion 12. Then, a mixing chamber 13 is formed below the main material storage portion 11 and the auxiliary material storage portion 12. The main material storage portion 11 and the auxiliary material storage portion 12 are each formed into a bag-like form in the interior of the storage container 10. Consequently, the storage container 10 is made into a double-layer structure.

Figure 2:
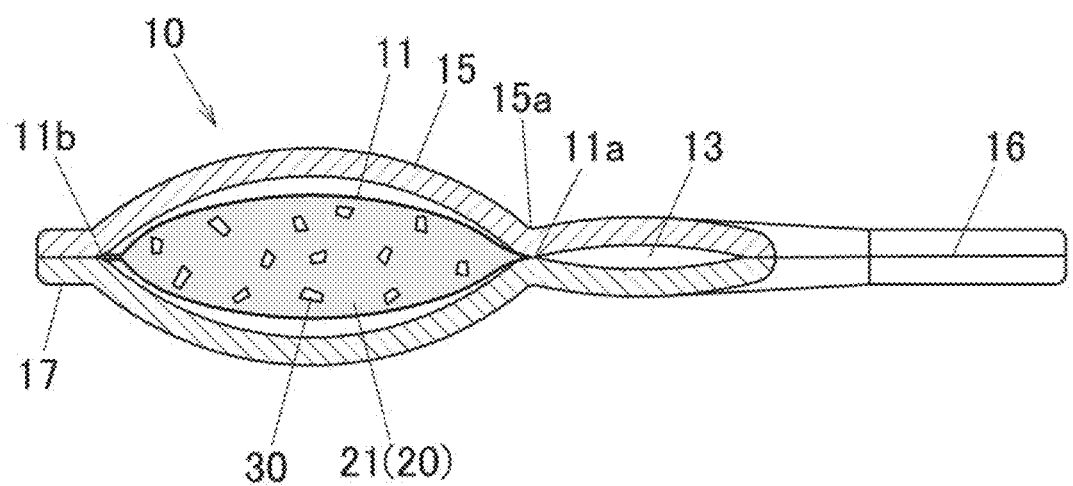
FIG. 2 is a sectional view of the storage container taken along a line II-II in FIG. 1.

The double-layer structure of the storage container 10 is shown specifically in FIG. 2. The main material storage portion 11 is formed of a transparent resin material into a bag-like form in an interior of an outer skin 15 of the storage container 10. Namely, as shown in FIG. 1, an outer circumferential edge of the main material storage portion 11 is defined by a straight-line opening portion 11a that is formed on a side thereof which faces the mixing chamber 13, a curved portion 11b that is curved into a shape which follows the protuberant portion of the heart-shaped storage portion 10, and a partition portion 14 that represents a boundary between the main material storage portion 11 and the auxiliary material storage portion 12. The opening portion 11a, the curved portion 11b and the partition portion 14 are joined together through fusion bonding.

A double-layer structure of the auxiliary material storage portion 12 of the storage container 10 is also formed in the same manner as the manner in which the main material storage portion 11 shown in FIG. 2 is formed. Then, as shown in FIG. 1, an outer circumferential edge of the auxiliary material storage portion 12 is also defined by an opening portion 12a, a curved portion 12b and the partition portion 14.

In fabricating the storage container 10, for example, curved portions 11b and partition portions 14 of two resin films which are formed into a shape defined by a combination of the main material storage portion 11 and the auxiliary material storage portion 12 are fusion bonded together. Following this, the main material 21 and the auxiliary material 22 are loaded into the defined spaces through the opening portions 11a, 12a, respectively, and then, the opening portions 11a, 12a are fusion bonded together. Then, the resulting storage member in which the main material 21 and the auxiliary material 22 are loaded is fixed between two resin films that form outer skins 15 of the storage container 10. Specifically speaking, the outer skins 15 are fusion bonded so that the curved portions 11b, 12b are held by outer circumferential portions 17 and that the opening portions 11a, 12a are held by holding portions 15a. By doing so, the storage member in which the main material 21 and the auxiliary material are sealed in separately is fixed to inner sides of the interior of the outer skins 15 of the storage container 10, and the mixing chamber 13 is formed.

Here, the opening portions 11a, 12a are fusion bonded with such a joining force that the opening portions 11a, 12a can be opened by an infant player pressing the main material storage portion 11 and the auxiliary material storage portion 12 with fingers of his or her left and right hands. Consequently, in mixing the two-pack silicone resin 20, firstly, portions of the storage container 10 which correspond to the main material storage portion 11 and the auxiliary material storage portion 12 are held to be pressed with the fingers (for example, a front body of a thumb and a side of an index finger that faces the thumb) of the left and right hands of the infant player to open the opening portions 11a, 12a. As this occurs, in the event that the outer skins 15 are joined together at the holding portions 15a, the joining of the outer skins 15 at the holding portions 15a is released at the same time as the opening portions 11a, 12a are opened.

Figure 3A:
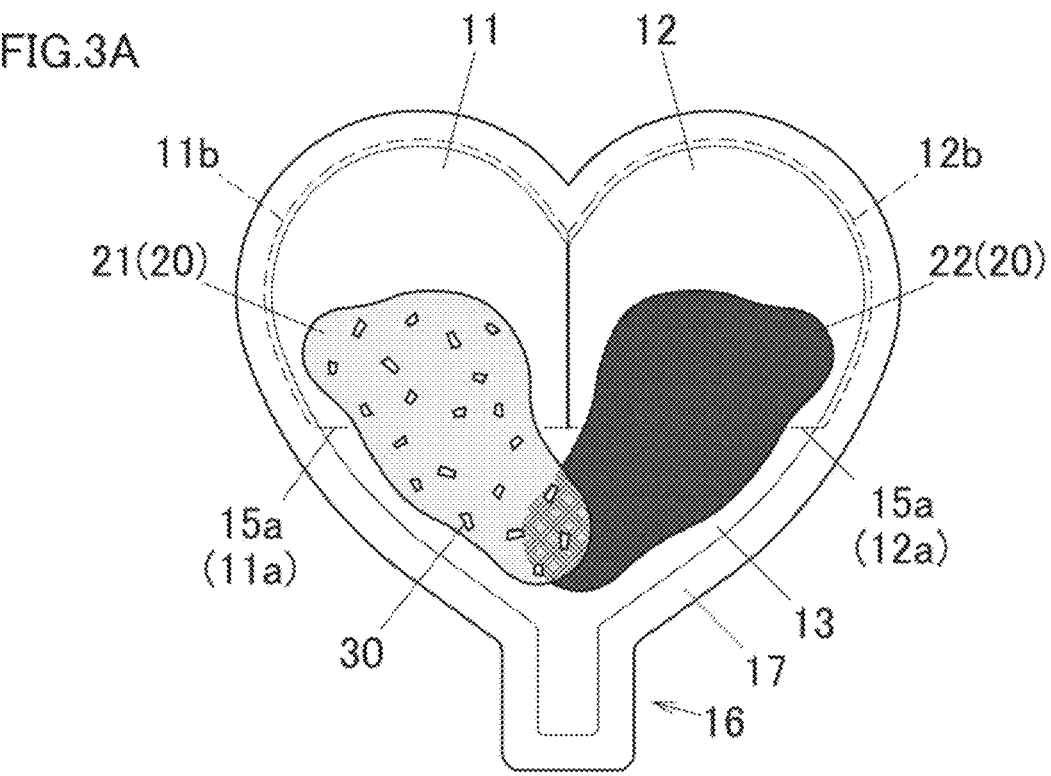
FIG. 3A is a schematic front view showing how the main material and the auxiliary material are mixed together into the mixed curable resin material in the accessory preparation toy according to the embodiment of the invention, which shows an initial stage of the mixing.
Figure 3B:
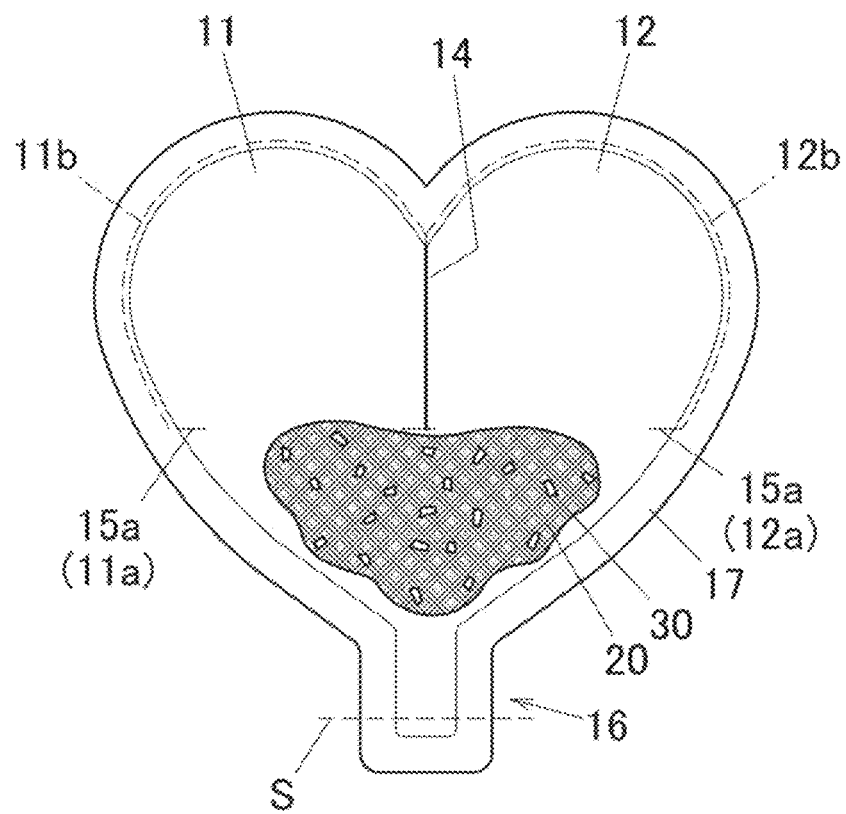
FIG. 3B is a schematic front view showing how the main material and the auxiliary material are mixed together into the mixed curable resin material in the accessory preparation toy according to the embodiment of the invention, which shows a final stage of the mixing.

Then, as shown in FIG. 3A, the main material 21 and the auxiliary material 22 are pushed out into the mixing chamber 13 with the fingers. Thereafter, the main material 21 and the auxiliary material 22 are mixed together in the mixing chamber 13 while being pressed with the fingers of the left and right hands. Here, the two-pack silicone resin 20 is set as a result of the main material 21 and the auxiliary material 22 being mixed together well, and therefore, it is difficult for infant players to do this mixing work while recognizing that the main material 21 and the auxiliary material 22 need to be mixed well to obtain accessories which are cured well. However, in the accessory preparation toy 1 according to the embodiment of the invention, the main material 21 includes the lamé flakes 30 which are mixed thereinto. Thus, as shown in FIG. 3B, due to the existence of the lamé flakes 30 in the main material 21, an infant player who plays with the accessory toy 1 will mix the main material 21 and the auxiliary material 22 so willingly that the lamé flakes 30 are mixed uniformly therein. Thus, the main material 21 and the auxiliary material 22 will be mixed well by the infant player who mixes those materials with joy without recognizing that the main material 21 and the auxiliary material 22 need to be mixed well to obtain accessories which are cured well.

After the lamé flakes 30 are mixed uniformly in the two-pack silicone resin 20, the projecting portion 16 is cut to be opened along a cutting line S indicated by a broken line in FIG. 3B with a pair of scissors. Then, as shown in FIG.

4, a discharge port 16a is formed at the cut-out portion. Then, the two-pack silicone resin 20 is poured into a desired mold 40a of a mold member 40, and in the event that the two-pack silicone resin 20 is left as it is in the mold 40 for a predetermined period of time, the two-pack silicone resin 20 is cured.

The mold member 40 can be formed of various types of resin or metal, and molds 40a of various sizes and shapes such as a heart shape, a star shape, a semi-circular shape, a rectangular shape and a ribbon shape can be provided on the molded member 40. However, in case the mold member 40 is formed of a resilient resin such as polyethylene, it is preferable that accessories 50 (refer to FIG. 5) can easily be removed from the molds 40a where the two-pack silicone resin 20 is poured to be cured by pressing the molds 40a from a back side of the mold member 40.

In this embodiment, while the interior of the storage container 10 is made up of the main material storage portion 11, the auxiliary material storage portion 12 and the mixing chamber 13, either the main material storage portion 11 or the auxiliary material storage portion 12 may be made to double as the mixing chamber 13. By adopting this configuration, either the main material 21 or the auxiliary material 22 can be moved to the other storage portion to be mixed with the other material.

Figure 5:
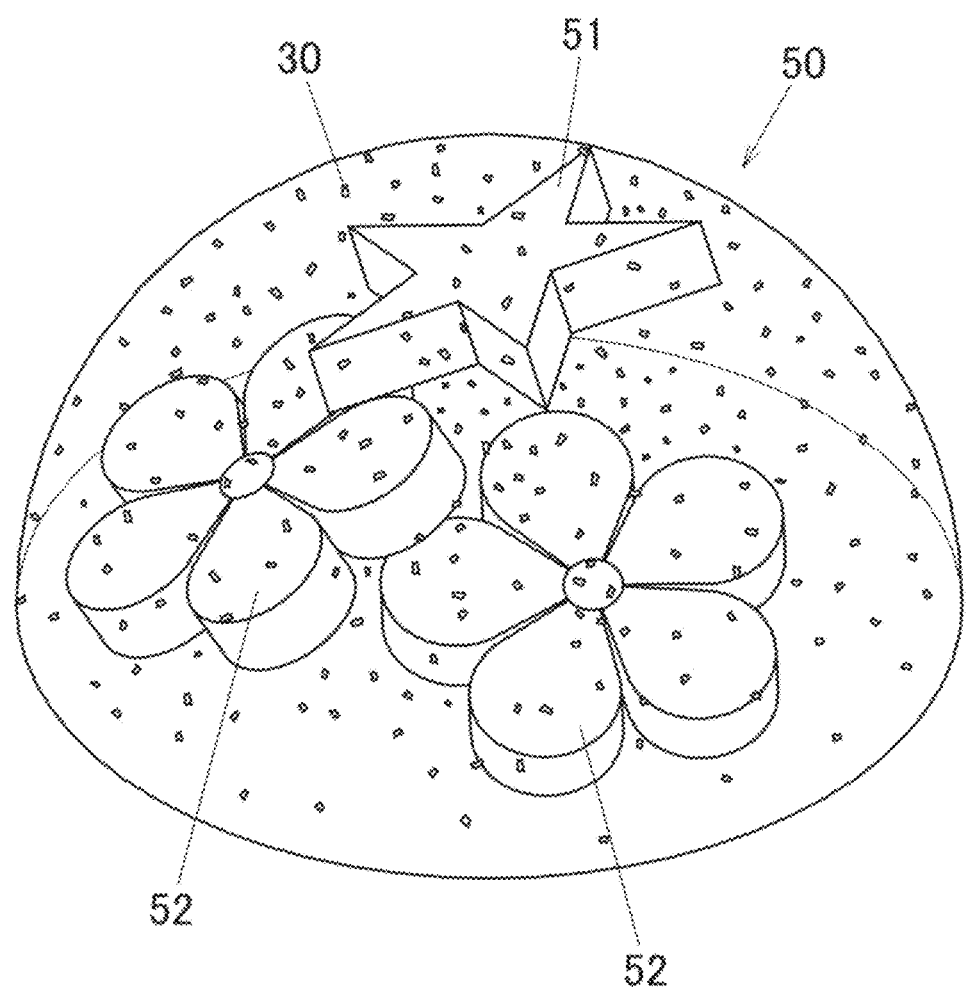
FIG. 5 is a perspective view showing accessories prepared by the accessory preparation toy according to the embodiment of the invention.

In addition, an accessory 50 can be prepared according to the preference of the infant player by putting flower-shaped and star-shaped decorative pieces 51, 52 like those shown in FIG. 5 in the molds 40a before or after the two-pack silicone resin 21 is poured from the storage container 10.

Figure 6:
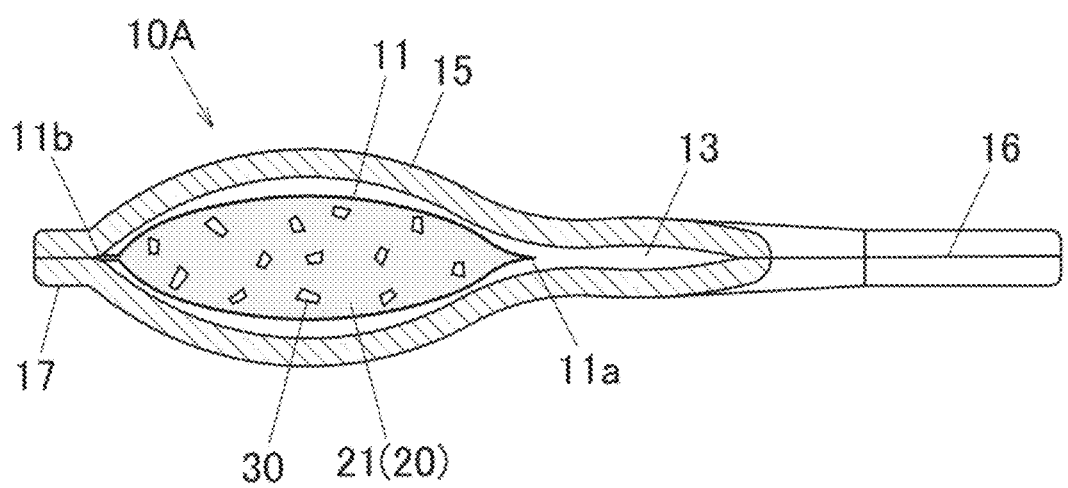
FIG. 6 is a sectional view showing a modified example of a storage container according to the embodiment of the invention.

Next, modified examples made to the storage container 10 will be described. FIG. 6 is a sectional view of a storage container 10A showing a section corresponding to the section taken along the line II-II shown in FIG. 1. In this storage container 10A, the fusion bonded portion to form the holding portion 15a of the storage container 10 in FIG. 2 is omitted.

Figure 7:
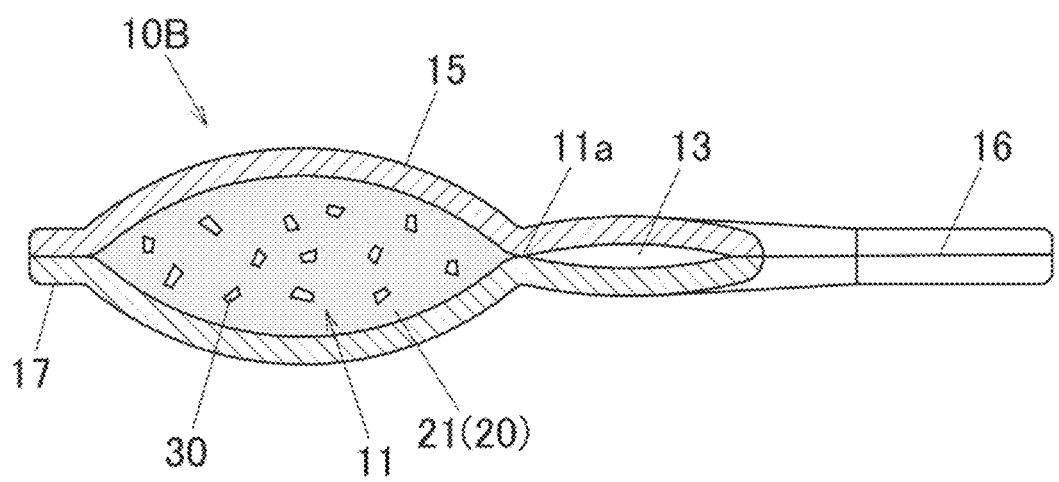
FIG. 7 is a sectional view showing another modified example of a storage container according to the embodiment of the invention.

Further, FIG. 7 shows another modified example made to the storage container 10. Similarly, FIG. 7 a sectional view of a storage container 10B showing a section corresponding to the section taken along the line II-II shown in FIG. 1. This storage container 10B has no double-layer structure. Instead, outer skins 15 are fusion bonded so as to form a main material storage portion 11 and an auxiliary material storage portion 12, so that the main material 21 and the auxiliary material 22 are loaded directly in an interior of the storage container 10B. As this occurs, opening portions 11a, 12a of the main material storage portion 11 and the auxiliary material storage portion 12 are formed by fusion bonding the outer skins 15. The opening portions 11a, 12a are also fusion bonded to such an extent that the opening portions 11a, 12a can be opened by pressing the main material 21 and the auxiliary material 22 with the fingers.

Figure 8:
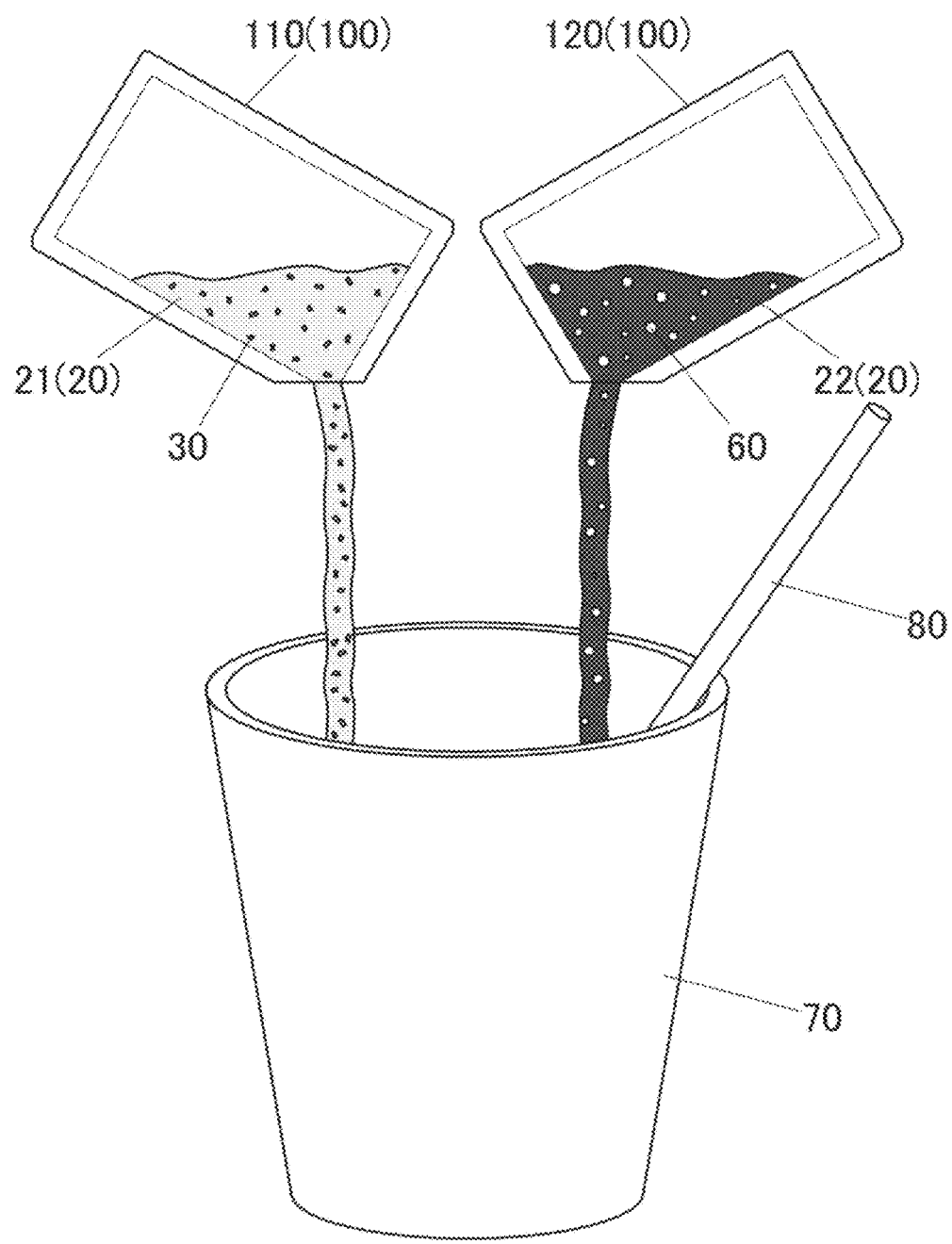
FIG. 8 is a perspective view showing schematically an accessory preparation toy according to another embodiment of the invention.

Next, another embodiment of an accessory preparation toy 1 according to the invention will be described based on FIG. 8. In the embodiment described above, the main material 21 and the auxiliary material 22 which are stored separately are made to be stored integrally in the storage container 10. However, as shown in FIG. 8, a main material 21 and an auxiliary material 22 may be stored separately in separate storage bags 110, 120 which represent separate storage containers 100. In addition, in the embodiment described above, the lamé material (the lamé flakes 30) which represents the decorative material is mixed only into the main material 21. However, a decorative material may also be mixed into the auxiliary material 22. As this occurs, a decorative material (resin chips 60 in this embodiment) which is different from the decorative material which is mixed into the main material 21 is mixed into the auxiliary material 22. By doing so, a mixing action of mixing the main material 21 and the auxiliary material 22 together is facilitated to be performed until the decorative materials of the main material 21 and the auxiliary material 22 are mixed uniformly.

In the embodiment shown in FIG. 8, in mixing the main material 21 and the auxiliary material 22 together, the main material 21 and the auxiliary material 22 are poured into a single glass 70 and are then stirred to be mixed well using a stirring rod 80. As this occurs, the materials need to be stirred so that air bubbles are not mixed into the resulting two-pack silicone resin 20. This is because in case air bubbles are mixed into the two-pack silicone resin 20, the air bubbles remain in the resulting accessory, deteriorating the external appearance of the accessory. According to the storage container 10 of the embodiment described above, the main material 21 and the auxiliary member 22 are mixed together while pressing the mixing chamber 13 with the fingers, and therefore, it is difficult for air bubbles to be mixed into the resulting two-pack silicone resin 20. However, in the case of the main material 21 and the auxiliary material 22 being stirred with the stirring rod 80, air bubbles are easily mixed into the resulting two-pack silicone resin 20. Thus, it becomes slightly difficult to perform properly the mixing work of the two liquid materials.

Thus, while the embodiments of the invention have been described heretofore, the invention is not limited by the embodiments and hence can be carried out while various modifications are made to the embodiments. For example, the mixed curable resin material is not limited to the two-pack silicone resin 20. Other resin materials may be used, provided that the materials are such as to be cured by being mixed together. Alternatively, a mixed curable resin material may be adopted which gets cured as a result of three or more liquid materials of a main material and two or more other auxiliary materials are mixed together. However, it is preferable to use the two-pack silicone resin 20 which is formed with an appropriate viscosity and which provides a good touch once it gets cured to thereby be easy to be handled.

In addition, the decorative materials are not limited to the lamé flakes 30 and the resin chips 60, and hence, the decorative materials can be selected from a pearlescent material, a flake or powder of glass, metal or silica, ground stone, a ground wood material or a coloring liquid material, or a combination of any or some of them. Namely, any other materials can be used as the decorative materials as long as the materials allow the player to visually recognize that the main material 21 and the auxiliary material are mixed uniformly. In addition, the decorative material may be mixed into either of the main material 21 and the auxiliary material 22 or decorative materials of different types may be mixed into both the main material 21 and the auxiliary material 22.

What is claimed is:
1. An accessory preparation toy having:
   a mixed curable resin material which is a two-pack silicone resin and is made up of a main material and an auxiliary material; and
   a storage container which has a main material storage portion for storing the main material therein and an auxiliary material storage portion for storing the auxiliary material separately therein, wherein:
     the main material storage portion or the auxiliary material storage portion has an opening that can be opened by pressing the main material or the auxiliary material therein with fingers, and either the main material storage portion or the auxiliary material storage portion doubles as a mixing chamber for moving the main material or the auxiliary material to the other of the main or auxiliary material storage portions to be mixed with the material therein; and a mold member formed of resilient resin comprising a mold that can hold a decorative piece, wherein the main material is configured to be mixed with a decorative material comprising one or more of a lamé, a pearlescent, a glass flake, a glass powder, a metal, a silica, a resin chip, ground stone, ground wood, or a coloring, and wherein the auxiliary material works as a curing agent.

2. An accessory preparation toy comprising:

a mixed curable resin material formed from a two-pack silicone resin that is made up of a main material and an auxiliary material, wherein the main material is configured to be mixed with a decorative material comprising one or more of a lamé, a pearlescent, a glass flake, a glass powder, a metal, a silica, a resin chip, ground stone, ground wood, or a coloring, and wherein the auxiliary material works as a curing agent;

a storage container comprising a main material storage portion where the main material is stored, an auxiliary material storage portion where the auxiliary material is stored, and a mixing chamber where the main material and the auxiliary material are mixed together, wherein the main material storage portion or the auxiliary material storage portion has an opening that can be opened by pressing the main material or the auxiliary material therein with fingers, wherein the opening is disposed so as to be opened to the mixing chamber; and a mold member formed of resilient resin comprising a mold that can hold a decorative piece.

* * * * *